US012621276B2

(12) United States Patent
Guo et al.

(10) Patent No.: US 12,621,276 B2
(45) Date of Patent: May 5, 2026

(54) SECURE CHANNEL SLEEP WAKE-UP METHOD, APPARATUS AND DEVICE

(71) Applicant: CHINA IWNCOMM CO., LTD., Shannxi (CN)

(72) Inventors: Jinfa Guo, Shaanxi (CN); Ming Du, Shaanxi (CN); Jun Cao, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 156 days.

(21) Appl. No.: 18/723,536

(22) PCT Filed: Dec. 22, 2022

(86) PCT No.: PCT/CN2022/141151
§ 371 (c)(1),
(2) Date: Jun. 24, 2024

(87) PCT Pub. No.: WO2023/130980
PCT Pub. Date: Jul. 13, 2023

(65) Prior Publication Data
US 2025/0080510 A1     Mar. 6, 2025

(30) Foreign Application Priority Data
Jan. 5, 2022    (CN) .......................... 202210005644.4

(51) Int. Cl.
*H04L 9/40*         (2022.01)
*H04L 9/08*         (2006.01)
(52) U.S. Cl.
CPC ........ *H04L 63/0428* (2013.01); *H04L 9/0869* (2013.01); *H04L 9/0891* (2013.01)
(58) Field of Classification Search
CPC .. H04L 63/0428; H04L 9/0869; H04L 9/0891
See application file for complete search history.

(56) References Cited

U.S. PATENT DOCUMENTS 8,560,848 B2 * 10/2013 Liu ........................ H04L 9/3236
                                                713/168
2007/0005972 A1 * 1/2007 Mizikovsky .......... H04L 9/3236
                                                713/171
(Continued)

FOREIGN PATENT DOCUMENTS

CN        106603485 A     4/2017
CN        109005028 A     12/2018
(Continued)

OTHER PUBLICATIONS

Extended European Search Report received for European Patent Application No. 22918423.9, mailed on Mar. 20, 2025, 12 pages.
(Continued)

*Primary Examiner* — Yonas A Bayou
(74) *Attorney, Agent, or Firm* — ArentFox Schiff LLP; Michael Fainberg

(57)         ABSTRACT

Embodiments of the present disclosure provide a secure channel sleep wake-up method, apparatus and device. The method comprises: when a node 1 is awakened from a sleep state, obtaining stored IP communication information communicating with a node 2, performing message encapsulation by using the IP communication information to obtain a first message, and sending the first message to the node 2; the node 2 obtaining the IP communication information and a key updating request message from the first message, and generating a second key according to information comprising a basic key corresponding to a basic key identifier in the key updating request message and a first random number generated by the node 1 and in combination with a second random number self-generated by the node 2; the node 1 obtaining the IP communication information and a key updating response message, and generating the second key and the second random number.

20 Claims, 4 Drawing Sheets

(56) References Cited

U.S. PATENT DOCUMENTS

| | | | |
|---|---|---|---|
| 2011/0055558 A1* | 3/2011 | Liu | H04L 9/0637 |
| | | | 713/160 |
| 2013/0235720 A1 | 9/2013 | Wang et al. | |
| 2014/0122888 A1* | 5/2014 | Yoon | H04L 9/0847 |
| | | | 713/171 |
| 2014/0215215 A1* | 7/2014 | Tanaka | H04L 63/061 |
| | | | 713/171 |
| 2016/0072807 A1* | 3/2016 | Park | H04L 63/061 |
| | | | 713/171 |
| 2016/0234804 A1* | 8/2016 | Hu | H04W 72/044 |
| 2016/0316362 A1* | 10/2016 | Ding | H04L 41/12 |
| 2019/0116029 A1* | 4/2019 | Pandey | H04L 63/068 |
| 2021/0219138 A1* | 7/2021 | Comarmond | H04W 8/205 |
| 2022/0417015 A1* | 12/2022 | Wang | H04L 9/0891 |

FOREIGN PATENT DOCUMENTS

| | | |
|---|---|---|
| CN | 113872755 A | 12/2021 |
| WO | 2021/168860 A1 | 9/2021 |

OTHER PUBLICATIONS

International Search Report and Written Opinion received for PCT Patent Application No. PCT/CN2022/141151, mailed on Mar. 3, 2023, 11 pages (5 pages of English Translation and 6 pages of Original Document).

* cited by examiner

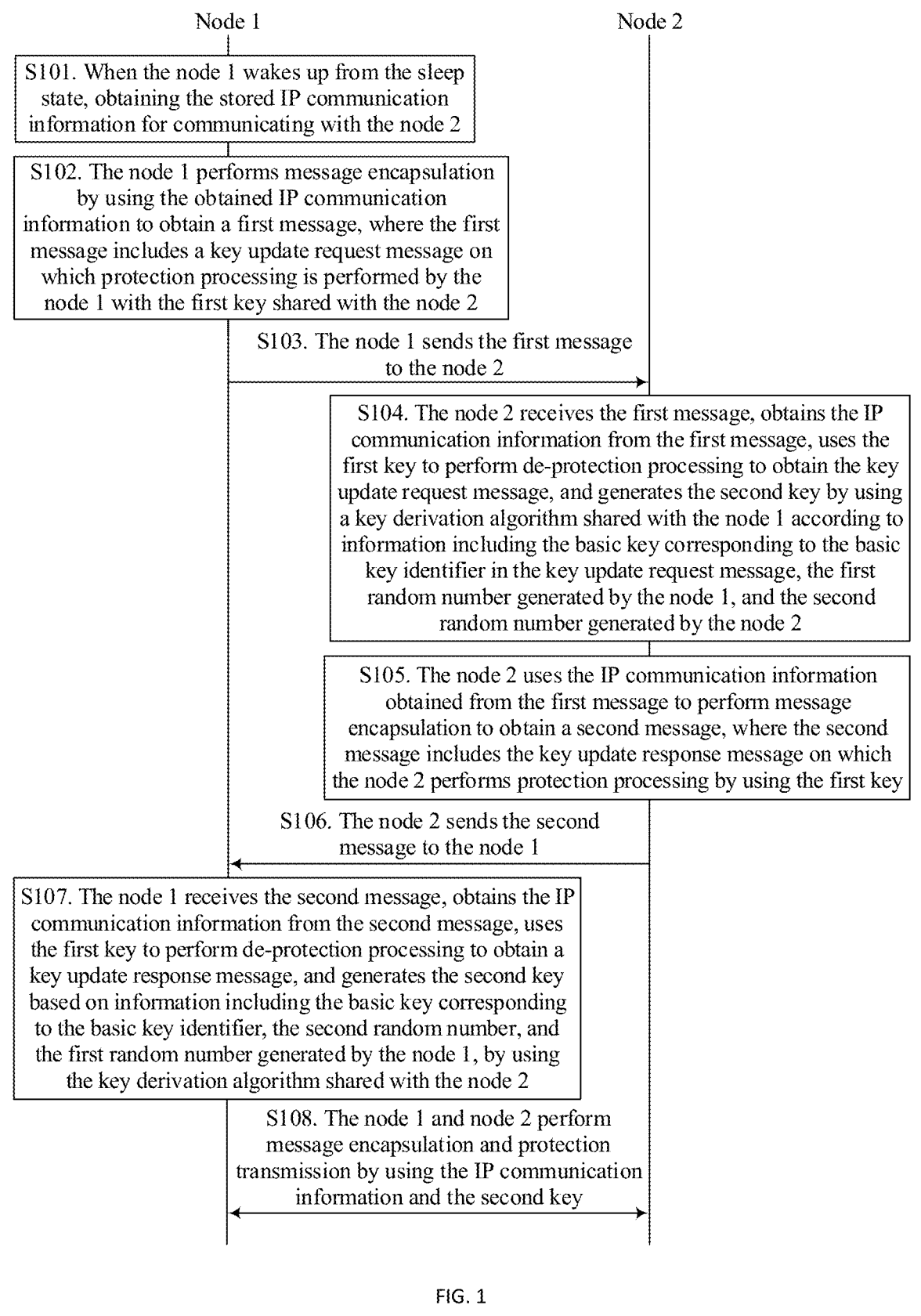

Node 1                                                  Node 2

S101. When the node 1 wakes up from the sleep
state, obtaining the stored IP communication
information for communicating with the node 2

S102. The node 1 performs message encapsulation
by using the obtained IP communication
information to obtain a first message, where the first
message includes a key update request message on
which protection processing is performed by the
node 1 with the first key shared with the node 2

S103. The node 1 sends the first message
to the node 2

S104. The node 2 receives the first message, obtains the IP
communication information from the first message, uses the
first key to perform de-protection processing to obtain the key
update request message, and generates the second key by using
a key derivation algorithm shared with the node 1 according to
information including the basic key corresponding to the basic
key identifier in the key update request message, the first
random number generated by the node 1, and the second
random number generated by the node 2

S105. The node 2 uses the IP communication information
obtained from the first message to perform message
encapsulation to obtain a second message, where the second
message includes the key update response message on which
the node 2 performs protection processing by using the first key S106. The node 2 sends the second
message to the node 1

S107. The node 1 receives the second message, obtains the IP
communication information from the second message, uses
the first key to perform de-protection processing to obtain a
key update response message, and generates the second key
based on information including the basic key corresponding
to the basic key identifier, the second random number, and
the first random number generated by the node 1, by using
the key derivation algorithm shared with the node 2

S108. The node 1 and node 2 perform
message encapsulation and protection
transmission by using the IP communication
information and the second key

FIG. 1

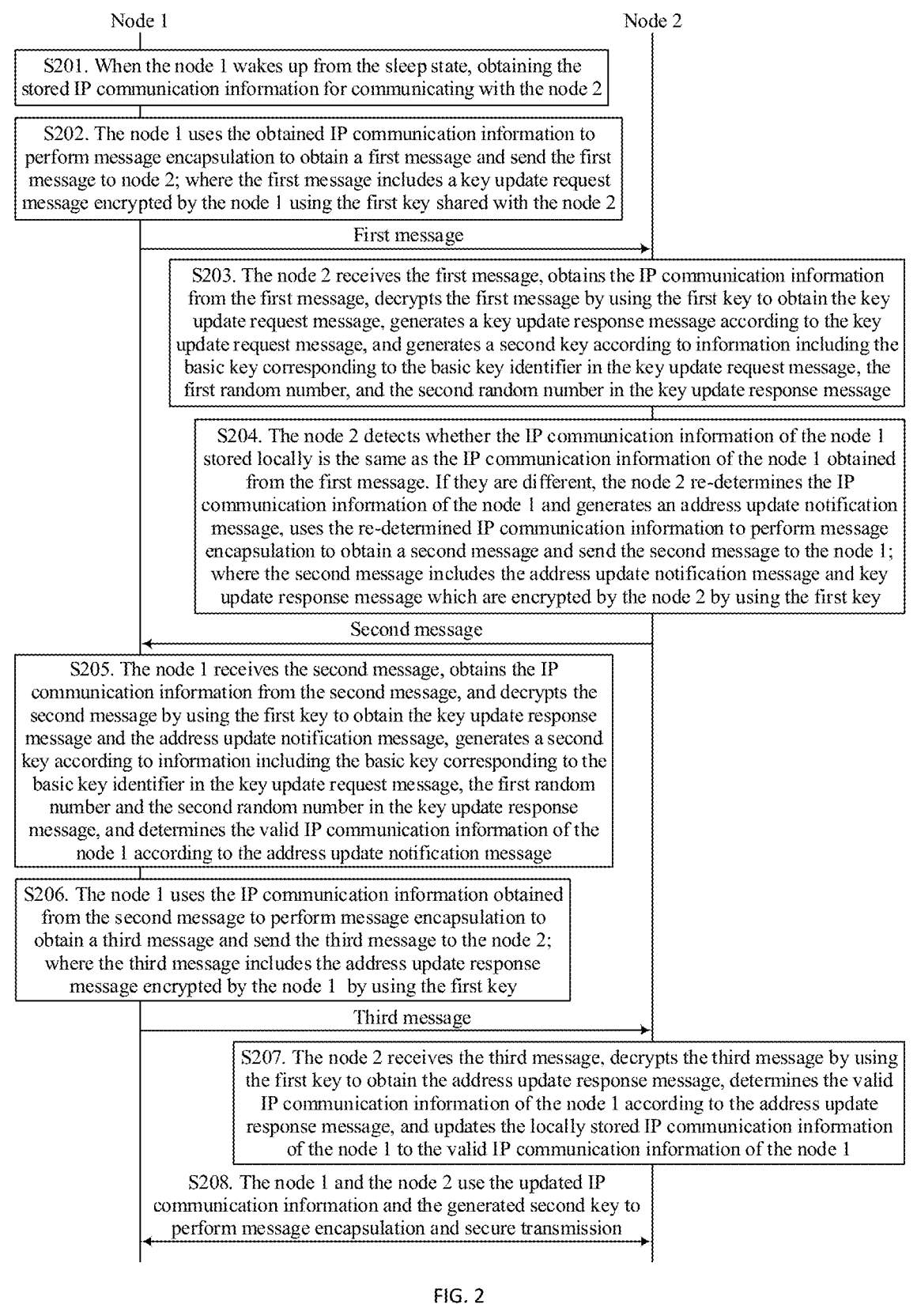

Node 1                                                                    Node 2

S201. When the node 1 wakes up from the sleep state, obtaining the stored IP communication information for communicating with the node 2

S202. The node 1 uses the obtained IP communication information to perform message encapsulation to obtain a first message and send the first message to node 2; where the first message includes a key update request message encrypted by the node 1 using the first key shared with the node 2

First message

S203. The node 2 receives the first message, obtains the IP communication information from the first message, decrypts the first message by using the first key to obtain the key update request message, generates a key update response message according to the key update request message, and generates a second key according to information including the basic key corresponding to the basic key identifier in the key update request message, the first random number, and the second random number in the key update response message S204. The node 2 detects whether the IP communication information of the node 1 stored locally is the same as the IP communication information of the node 1 obtained from the first message. If they are different, the node 2 re-determines the IP communication information of the node 1 and generates an address update notification message, uses the re-determined IP communication information to perform message encapsulation to obtain a second message and send the second message to the node 1; where the second message includes the address update notification message and key update response message which are encrypted by the node 2 by using the first key Second message S205. The node 1 receives the second message, obtains the IP communication information from the second message, and decrypts the second message by using the first key to obtain the key update response message and the address update notification message, generates a second key according to information including the basic key corresponding to the basic key identifier in the key update request message, the first random number and the second random number in the key update response message, and determines the valid IP communication information of the node 1 according to the address update notification message S206. The node 1 uses the IP communication information obtained from the second message to perform message encapsulation to obtain a third message and send the third message to the node 2; where the third message includes the address update response message encrypted by the node 1 by using the first key Third message S207. The node 2 receives the third message, decrypts the third message by using the first key to obtain the address update response message, determines the valid IP communication information of the node 1 according to the address update response message, and updates the locally stored IP communication information of the node 1 to the valid IP communication information of the node 1

S208. The node 1 and the node 2 use the updated IP communication information and the generated second key to perform message encapsulation and secure transmission

FIG. 2

SECURE CHANNEL SLEEP WAKE-UP METHOD, APPARATUS AND DEVICE

CROSS-REFERENCE TO RELATED APPLICATIONS

The present disclosure is a national phase entry under 35 U.S.C § 371 of International Application No. PCT/CN2022/141151, filed on Dec. 22, 2022, which claims the priority of the Chinese patent application submitted to the China National Intellectual Property Administration on Jan. 5, 2022, with the application Ser. No. 20/221,0005644.4, and the application name is "Secure Channel Sleep Wake-Up Method, Apparatus, and Computer-Readable Storage Medium", the entire contents of which are incorporated herein by reference.

TECHNICAL FIELD

The present disclosure relates to the technical field of network communication, in particular to a secure channel sleep wake-up method, apparatus and device.

BACKGROUND

Tunneling technology is a technology that transmits data between networks by using the infrastructure of the Internet. The data transmitted through the tunnel can be data frames or packets of different protocols. The tunneling protocol re-encapsulates and sends the data frames or packets of these other protocols in the new header. During implementation, in order to reduce resource consumption such as power and network bandwidth or other reasons, some communication devices will turn the tunnel into a sleep state and stop tunnel communication under certain conditions.

However, in the related art, if the tunnel sleeps for a long time, the probability of the dormant device being cracked is high. Then when the illegal device uses communication parameters obtained by cracking the dormant device to pretend to be a legitimate device to attack the tunnel communication, it is hard to distinguish for other communication devices, causing less secure.

SUMMARY

Embodiments of the present disclosure provides a secure channel sleep wake-up method, apparatus and device to solve the problem that tunnel communication security is poor because one of communication nodes is easy to be cracked when the communication node sleeps in the related art, and can also avoid complex time-consuming time caused by renegotiation or configuration of communication parameters after waking up.

In a first aspect, an embodiment of the present disclosure provides a secure channel sleep wake-up method, including:

in response to a node 1 waking up from a sleep state, obtaining, by the node 1, stored IP communication information for communicating with a node 2, where the IP communication information includes at least one of an IP address, a communication port number, or a session identifier;

using, by the node 1, the IP communication information to perform message encapsulation to obtain a first message and sending the first message to the node 2, where the first message includes a key update request message subject to protection processing by using a first key shared with the node 2, and the key update request message includes a basic key identifier and a first random number generated by the node 1;

receiving, by the node 2, the first message, obtaining the IP communication information from the first message, using the first key to perform de-protection processing to obtain the key update request message, and calculating and generating a second key based on information including a basic key corresponding the basic key identifier and the first random number in the key update request message, and a second random number generated by the node 2;

using, by the node 2, the IP communication information to perform message encapsulation to obtain a second message and sending the second message to the node 1, where the second message includes a key update response message subject to protection processing by using the first key, and the key update response message includes the second random number;

receiving, by the node 1, the second message, obtaining the IP communication information from the second message, and using the first key to perform de-protection processing to obtain the key update response message, calculating and generating the second key based on information including the basic key corresponding to the basic key identifier and the second random number, and the first random number generated by the node 1; and using, by the node 1 and the node 2, the IP communication information and the second key to perform message encapsulation and protection transmission.

Optionally, in response to the node 1 waking up from the sleep state, the obtaining the stored IP communication information for communicating with the node 2, includes:

if the IP communication information of the node 1 does not change in response to the node 1 waking up, obtaining, by the node 1, the IP communication information stored before entering the sleep state;

if the IP communication information of the node 1 changes in response to the node 1 waking up, storing immediately and obtaining, by the node 1, the changed IP communication information.

Optionally, after receiving, by the node 2, the first message, the method further includes:

in response to the node 2 detecting that locally stored IP communication information of the node 1 is different from the IP communication information of the node 1 in the first message, re-determining, by the node 2, the IP communication information of the node 1 and generating an address update notification message, where the address update notification message is used to indicate the re-determined IP communication information of the node 1;

the using, by the node 2, the IP communication information to perform message encapsulation to obtain the second message and sending the second message to the node 1, further includes:

performing, by the node 2, protection processing on the address update notification message by using the first key, carrying the address update notification message after the protection processing in the second message, and sending the address update notification message in the second message to the node 1.

Optionally, after receiving, by the node 1, the second message, the method further includes:

using, by the node 1, the first key to perform de-protection processing to obtain the address update notification message, and determining a valid IP communication information of the node 1 according to the address update notification message;

using, by the node 1, the IP communication information obtained from the second message to perform message encapsulation to obtain a third message and sending the third message to the node 2, where the third message includes an address update response message subject to protection processing by using the first key, and the address update response message is used to indicate the valid IP communication information of the node 1;

receiving, by the node 2, the third message, using the first key to perform the de-protection processing to obtain the address update response message, and determining the valid IP communication information of the node 1 according to the address update response message; and updating, by the node 2, the locally stored IP communication information of the node 1 to the valid IP communication information of the node 1.

Optionally, the re-determining, by the node 2, the IP communication information of the node 1, includes:

determining, by the node 2, that the locally stored IP communication information of the node 1 is a first IP communication information, and determining that the IP communication information of the node 1 in the first message is a second IP communication information;

the generating, by the node 2, the address update notification message, performing protection processing on the address update notification message by using the first key, carrying the address update notification message after the protection processing in the second message, and sending the address update notification message in the second message to the node 1, includes:

generating, by the node 2, a first address update notification message for indicating the first IP communication information, and generating a second address update notification message for indicating the second IP communication information;

performing by the node 2, protection processing on the first address update notification message by using the first key, carrying the first address update notification message after the protection processing in the second message, and sending the first address update notification message in the second message to a node corresponding to the first IP communication information; and performing by the node 2, protection processing on the second address update notification message by using the first key, carrying the second address update notification message after the protection processing in the second message, and sending the second address update notification message in the second message to a node corresponding to the second IP communication information.

Optionally, the key update response message further includes a first random number obtained by the node 2 from the key update request message;

after obtaining the key update response message by the node 1, checking by the node 1, whether the first random number in the key update response message is the same as the first random number generated by the node 1; if not, discarding the key update response message.

Optionally, the key update request message further includes identity information of the node 1, and the key update response message further includes identity information of the node 2;

after using, by the node 2, the first key to perform de-protection processing to obtain the key update request message, the method further includes:

using, by the node 2, the identity information of the node 1 in the key update request message to determine whether the node 1 is a legitimate node;

after using, by the node 1, the first key to perform de-protection processing to obtain the key update response message, the method further includes:

using, by the node 1, the identity information of the node 2 in the key update response message to determine whether the node 2 is a legitimate node.

Optionally, the calculating and generating the second key by the node 2 based on the information including the basic key corresponding to the basic key identifier and the first random number in the key update request message, and the second random number generated by the node 2, includes:

calculating and generating by the node 2, the second key based on information including the basic key corresponding to the basic key identifier, the first random number, and the identity information of the node 1 in the key update request message, and the second random number generated by the node 2, the identity information of the node 2 and a constant character string;

the calculating and generating by the node 1, the second key based on the information including the basic key corresponding to the basic key identifier and the second random number, and the first random number generated by the node 1, includes:

calculating and generating by the node 1, the second key based on information including the basic key corresponding to the basic key identifier, the second random number and the identity information of the node 2, and the first random number generated by the node 1, the identity information of the node 1 and the constant character string;

the constant character string is an optional field pre-shared between the node 1 and the node 2.

Optionally, the method further includes:

in response to an anti-replay counter value changing, immediately storing by the node 1 and/or the node 2, changed anti-replay counter value; in response to the node 1 waking up from the sleep state, further obtaining stored anti-replay counter value;

in response to the node 1 and/or the node 2 performing message encapsulation, further including:

encapsulating an anti-replay counter value field into a sent message;

in response to the node 1 and/or the node 2 receiving the message, further including:

using an anti-replay algorithm to verify whether the anti-replay counter value field in a received message is within a legal range.

Optionally, in response to the node 1 and/or the node 2 performing message encapsulation, the method further includes:

encapsulating a verification field for verifying integrity of a message into a sent message; where the verification field is generated by performing integrity verification on information in the message through a verification key shared by the node 1 and the node 2;

in response to the node 1 and/or the node 2 receiving the message, the method further includes:

using the verification key to verify the verification field in a received message to determine whether the message is complete.

In a second aspect, an embodiment of the present disclosure further provides a secure channel sleep wake-up apparatus, configured on a node 1, including:

a sleep wake-up unit configured to obtain stored IP communication information for communicating with a node 2 in response to the node 1 waking up from a sleep state, where the IP communication information includes at least one of an IP address, a communication port number, or a session identifier;

a first processing unit configured to use the IP communication information to perform message encapsulation to obtain a first message and send the first message to the node 2, where the first message includes a key update request message subject to protection processing by using a first key shared with the node 2, and the key update request message includes a basic key identifier and a first random number generated by the node 1;

a second processing unit configured to receive a second message sent by the node 2, obtain the IP communication information from the second message, and use the first key to perform a de-protection processing to obtain a key update response message, where the key update response message includes a second random number generated by the node 2;

the second processing unit further configured to calculate and generate a second key based on information including a basic key corresponding to the basic key identifier and the second random number, and the first random number generated by the node 1; and a communication unit configured to perform message encapsulation and protection transmission with the node 2 by using the IP communication information and the second key.

In a third aspect, an embodiment of the present disclosure further provides a secure channel sleep wake-up apparatus, configured on a node 2, including:

a first processing unit configured to receive a first message sent by a node 1, obtain a IP communication information from the first message, and use a first key shared with the node 1 to perform de-protection processing to obtain a key update request message, where the key update request message includes a basic key identifier and a first random number generated by the node 1;

where the first message includes the key update request message subject to protection processing by the node 1 using the first key shared with the node 2; the IP communication information includes at least one of an IP address, a communication port number or a session identifier;

the first processing unit further configured to calculate and generate a second key based on information including a basic key corresponding to the basic key identifier and the first random number, and a second random number generated by the node 2;

a second processing unit configured to use the IP communication information to perform message encapsulation to obtain a second message and send the second message to the node 1, where the second message includes a key update response message subject to protection processing by using the first key, and the key update response message includes the second random number; and a communication unit configured to perform the message encapsulation and protection transmission with the node 1 by using the IP communication information and the second key.

In a fourth aspect, an embodiment of the present disclosure further provides a secure channel sleep wake-up device, including:

a memory configured to store program instructions; and a processor configured to invoke the program instructions stored in the memory, and execute the method at the node 1 according to the first aspect based on obtained program instructions.

In a fifth aspect, an embodiment of the present disclosure further provides a secure channel sleep wake-up device, including:

a memory configured to store program instructions; and a processor configured to invoke the program instructions stored in the memory, and execute the method at the node 2 according to the first aspect based on obtained program instructions.

In a sixth aspect, an embodiment of the present disclosure further provides a computer-readable storage medium, on which computer programs are stored, and when the computer programs are executed by a processor, steps of the secure channel sleep wake-up method according to the first aspect are implemented.

The beneficial effects of the present disclosure are as follows.

The embodiments of the present disclosure provide a secure channel sleep wake-up method, apparatus and device, the IP communication information for communication between nodes is stored through a communication node, and the stored IP communication information can be obtained after one of the nodes wakes up from sleep, so that the information can continue to be sent and received to or from another node after waking up from sleep. At the same time, after each node wakes up from sleep, it needs to renegotiate a new key for subsequent communication, so as to avoid hidden danger that the security of the secure channel is greatly reduced due to key leakage during the long-term sleep process, and avoid complex and time-consuming operation caused by renegotiation or configuration of communication parameters after waking up.

BRIEF DESCRIPTION OF FIGURES

FIG. 1 is a schematic flow diagram of a secure channel sleep wake-up method provided in an embodiment of the present disclosure.

FIG. 2 is a schematic flow diagram of another secure channel sleep wake-up method provided by an embodiment of the present disclosure.

DETAILED DESCRIPTION

Figure 3:
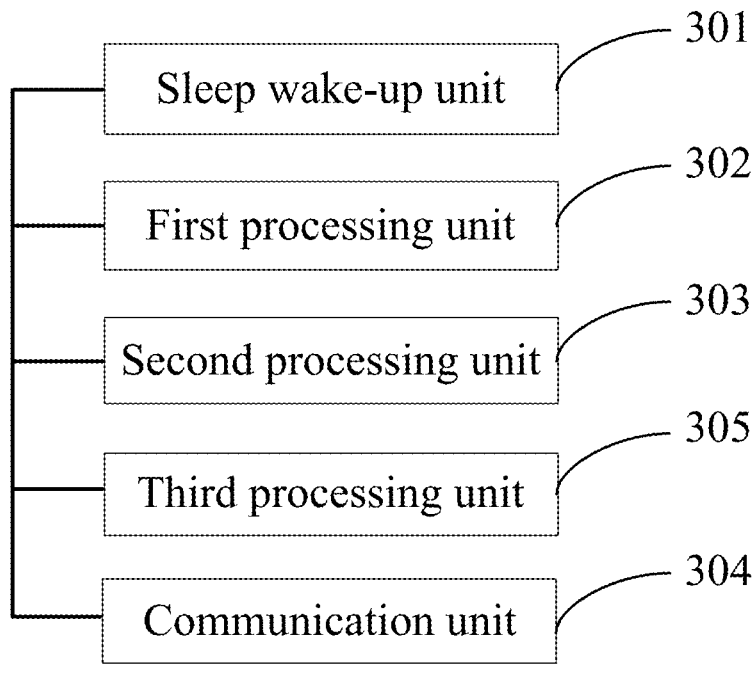
FIG. 3 is a schematic structural diagram of a secure channel sleep wake-up apparatus provided by an embodiment of the present disclosure.

In order to make the above objects, features and advantages of the present disclosure more obvious and comprehensible, the present disclosure will be further described below in conjunction with the accompanying drawings and embodiments. Example embodiments may, however, be embodied in many forms and should not be construed as limited to the embodiments set forth herein; rather, these embodiments are provided so that the present disclosure will be thorough and complete, and will fully convey the concept of example embodiments to those skilled in the art. The same reference numerals denote the same or similar structures in the drawings, and thus their repeated descriptions will be omitted. The words expressing position and direction described in the present disclosure are all described by taking the accompanying drawings as an example, but changes can also be made according to requirements, and all changes are included in the protection scope of the present disclosure. The drawings in the present disclosure are only used to illustrate the relative positional relationship and do not represent the true scale.

It should be noted that specific details are set forth in the following description to facilitate a full understanding of the present disclosure. However, the present disclosure can be implemented in many other ways different from those described here, and those skilled in the art can make similar promotions without departing from the connotation of the present disclosure. The present disclosure is therefore not limited by the specific embodiments disclosed below. The subsequent description of the specification is a preferred implementation mode for implementing the present disclosure, but the description is for the purpose of illustrating the general principles of the present disclosure, and is not intended to limit the scope of the present disclosure. The scope of protection of the present disclosure should be defined by the appended claims.

It should be noted that the node 1 and the node 2 mentioned in the embodiments of the present disclosure do not specifically refer to a certain communication node. For example, there are two communication nodes A and B performing secure channel communication. First, node A wakes up after going into sleep. Then, at this time, node A is the node 1 and node B is the node 2. Then node B wakes up after going into sleep, then at this time, node B is the node 1, and node A is the node 2.

The secure channel sleep wake-up method, apparatus and device provided by the embodiments of the present disclosure will be described in detail below with reference to the accompanying drawings.

The embodiments of the present disclosure provide a secure channel sleep wake-up method, as shown in FIG. 1, including followings.

S101. When the node 1 wakes up from a sleep state, stored IP communication information for communicating with the node 2 is obtained.

It should be noted that when communication connection is established between the node 1 and the node 2 for the first time, the node 1 and the node 2 each store IP communication information used for the communication connection. In the process of subsequent communication, once the IP communication information changes, the node 1 and the node 2 immediately store the changed IP communication information in a computer-readable storage medium.

Here, the IP communication information includes at least one of an IP address, a communication port number or a session identifier. The IP address is the IP address of the node 1 and the node 2, the communication port number is the communication port number of the node 1 and the node 2, and the session identifier is a Session Identifier, SID of the node 1 and the node 2.

Trigger conditions for the node 1 to enter the sleep state include passive sleep trigger conditions such as device power-off, system shutdown, and program abnormal exit, or include active sleep trigger conditions such as receipt of a state control message indicating to enter the sleep state, and reaching a preset sleep start time. If the node 1 enters the sleep state due to an active trigger condition, the node 1 will stop sending and receiving any other data except a state control message(s) (for example, an address update message (s)) and a key update message(s). If the node 1 enters the sleep state due to a passive trigger condition, the node 1 will not be able to send or receive any data.

When the node 1 enters the sleep state, the node 1 has stored the IP communication information communicated with the node 2 before entering the sleep state. In addition, before the node 1 enters the sleep state, the first key is used between the node 1 and the node 2 to protect the transmission of the message.

Trigger wakeup conditions for the node 1 to wake up from the sleep state include passive wakeup trigger conditions such as device power-on, system booting, and program reloading, or include active wakeup trigger conditions such as receipt of a state control message indicating wakeup, and the end of a preset sleep time.

When the node 1 wakes up from the sleep state, the node 1 can obtain the IP communication information for communicating with the node 2 from the computer-readable storage medium storing the IP communication information.

S102. The node 1 performs message encapsulation by using the obtained IP communication information to obtain a first message, where the first message includes a key update request message on which protection processing is performed by the node 1 with the first key shared with the node 2.

The node 1 uses the first key to perform protection processing on the key update request message, including: using the first key to perform at least one protection processing such as encryption and integrity verification etc., on the key update request message.

Exemplarily, relevant fields of the first message are composed as follows.

| $IP_1$ | $IP_2$ | $Port_1$ ($SID_1$) | $Port_2$ ($SID_2$) | $EncData_1$ |
| --- | --- | --- | --- | --- |

$IP_1$ is an IP address of the node 1, $IP_2$ is an IP address of the node 2; Port is a communication port number of the node 1, $Port_2$ is a communication port number of the node 2; $SID_1$ is a session identifier of the node 1, and $SID_2$ is a session identifier of the node 2; $EncData_1$ is an encrypted field formed by the node 1 encrypting to-be-protected data, and corresponds to the encrypted key update request message in S102.

The key update request message includes a basic key identifier and a first random number generated by the node 1. As an optional way, the first random number can be generated by the node 1 when generating the key update request message.

S103. The node 1 sends the first message to the node 2.

S104. The node 2 receives the first message, obtains the IP communication information from the first message, uses the first key to perform de-protection processing to obtain the key update request message, and generates the second key by using a key derivation algorithm shared with the node 1 according to information including the basic key corresponding to the basic key identifier in the key update request message, the first random number generated by the node 1, and the second random number generated by the node 2.

The node 2 uses the first key to de-protect the protected key update request message, including: using the first key to correspondingly perform at least one de-protection processing such as decryption, integrity verification etc., on the protected key update request message.

As an optional way, the second random number may be generated by the node 2 when generating the key update response message after obtaining the key update request message and verifying correctness of the key update request message. The node 2 may use relevant fields in the key update request message to verify the correctness of the key update request message.

As an optional way, the node 2 may use the basic key identifier in the key update request message to verify the correctness of the key update request message, and/or, when the key update request message further includes identity information $ID_1$ of the node 1, the node 2 can also use $ID_1$ in the key update request message to verify the correctness of the key update request message. The verification process includes but is not limited to: the node 2 can use the basic key identifier in the key update request message to compare with a pre-shared basic key identifier stored by the node 2 with the node 1, so as to determine the correctness of the key update request message, and/or the node 2 uses the basic key identifier in the key update request message to search a corresponding basic key, and determines the correctness of the key update request message according to a search result of the basic key, and/or when the key update request message further includes the identity information $ID_1$ of the node 1, the node 2 uses $ID_1$ in the key update request message to compare with identity information $ID_1$ of the node 1 stored by the node 2, so as to determine the correctness of the key update request message.

It should be noted that when the node 1 receives the key update response message subsequently, it can also verify its correctness. The implementation manner of the node 1 for verifying the key update response message is similar to the implementation manner of the node 2 for verifying the key update request message, which will not be repeated here.

S105. The node 2 uses the IP communication information obtained from the first message to perform message encapsulation to obtain a second message, where the second message includes the key update response message on which the node 2 performs protection processing by using the first key.

The node 2 uses the first key to protect the key update response message, including: using the first key to perform at least one protection processing such as encryption and integrity verification etc., on the key update response message.

For example, relevant fields of a second message are composed as follows.

| $IP_2$ | $IP_1$ | $Port_2$ $(SID_2)$ | $Port_1$ $(SID_1)$ | $EncData_2$ |
|---|---|---|---|---|

$EncData_2$ is an encrypted field formed by the node 2 encrypting to-be-protected, and corresponds to the encrypted key update response message in S105.

The key update response message includes a second random number generated by the node 2.

S106. The node 2 sends the second message to the node 1.

S107. The node 1 receives the second message, obtains the IP communication information from the second message, uses the first key to perform de-protection processing to obtain a key update response message, and generates the second key based on information including the basic key corresponding to the basic key identifier, the second random number, and the first random number generated by the node 1, by using the key derivation algorithm shared with the node 2.

The node 1 uses the first key to de-protect the protected key update response message, including: using the first key to perform at least one de-protection processing such as decryption, integrity verification etc., on the protected key update response message.

The basic key identifier and corresponding basic key are pre-shared between the node 1 and the node 2. The basic key identifier is used to indicate the corresponding basic key, and the basic key is used as a seed key for deriving other keys. The second key refers to a new key enabled between the node 1 and the node 2 after the node 1 waking up from sleep and is used for protection communication between the node 1 and the node 2.

S108. The node 1 and node 2 perform message encapsulation and protection transmission by using the IP communication information and the second key.

In the embodiments of the present disclosure, because the node 1 has stopped communicating with the node 2 after entering the sleep state, the node 2 cannot determine whether the node 1 has leaked the first key during sleep, so in order to ensure communication security, the node 1 and the node 2 need to renegotiate a key for communication, and the node 1 and the node 2 use a second key newly generated to protect the transmission of messages, which can prevent illegal nodes from using the old first key to pretend to be the node 1 to destroy the secure channel communication.

After the node 1 waking up from sleep, the IP communication information thereof may change.

Exemplarily, the IP address of the node 1 changes after waking up from sleep, or there is a Network Address Translation, NAT, device between the node 1 and the node 2, and after the node 1 wakes up from sleep, the NAT device re-maps the IP address of the node 1, or the communication port number of the node 1 changes after the node 1 wakes up from sleep, etc.

Therefore, after receiving the first message sent by the node 1, the node 2 needs to confirm whether the IP communication information of the node 1 has really changed, so as to prevent communication with an illegal node masquerading as the node 1.

Therefore, on the basis of the embodiments in FIG. 1, as shown in FIG. 2, the embodiments of the present disclosure further provides a secure channel sleep wake-up method, including the following.

S201. When the node 1 wakes up from a sleep state, stored IP communication information for communicating with the node 2 is obtained.

If the node 1 determines that the IP communication information has not changed when waking up, the IP communication information obtained by the node 1 is the IP communication information that the node 1 has stored before entering the sleep state; if the node 1 determines that the IP communication information has changed when waking up, the node 1 immediately stores the changed IP communication information and obtains the changed IP communication information. Exemplarily, the node 1 is a multi-homed host, and after waking up, the node 1 can detect whether the IP communication information currently used by the operating system is the same as the IP communication information stored before sleep.

S202. The node 1 uses the obtained IP communication information to perform message encapsulation to obtain a first message and send the first message to node 2. The first message includes a key update request message encrypted by the node 1 using the first key shared with the node 2.

S203. The node 2 receives the first message, obtains the IP communication information from the first message, decrypts the first message by using the first key to obtain the key update request message, generates a key update response message according to the key update request message, and generates a second key according to information including the basic key corresponding to the basic key identifier in the key update request message, the first random number, and the second random number in the key update response message.

After the node 2 decrypts the key update request message, if the node 2 determines that it has the basic key identifier in the key update request message, then the node 2 generates a second random number, and generates the key update response message according to information including the second random number.

S204. The node 2 detects whether the IP communication information of the node 1 stored locally is the same as the IP communication information of the node 1 obtained from the first message. If they are different, the node 2 re-determines the IP communication information of the node 1 and generates an address update notification message, uses the re-determined IP communication information to perform message encapsulation to obtain a second message and send the second message to the node 1. The second message includes the address update notification message and key update response message which are encrypted by the node 2 by using the first key.

The address update notification message includes the re-determined IP communication information of the node 1.

For example, relevant fields of the address update notification message are composed as follows.

| Address update notification identifier | IP$_1$' | Port$_1$'(SID$_1$') |
| --- | --- | --- |

IP$_1$', Port$_1$' (SID$_1$') are the re-determined IP communication information of the node 1, the "address update notification identifier" field is used to indicate whether the message is a notification message or a response message, and an address update notification identifier is different from an address update response identifier.

It should be noted that if the node 2 detects that the IP communication information of the node 1 stored locally is the same as the IP communication information of the node 1 in the first message, the node 2 will not generate an address update notification message in S204, and the second message does not carry the encrypted address update notification message. The subsequent interaction process between the node 1 and the node 2 includes: after receiving the second message, the node 1 obtains the IP communication information from the second message and uses the first key to decrypt to obtain a key update response message, and generates the second key according to information including the basic key corresponding to the basic key identifier in the key update request message, and the first random number, and the second random number in the key update response message. The node 1 and the node 2 use the obtained IP communication information and the second key to perform message encapsulation and secure transmission. The specific process refers to the description in the embodiments in FIG. 1.

S205. The node 1 receives the second message, obtains the IP communication information from the second message, and decrypts the second message by using the first key to obtain the key update response message and the address update notification message, generates a second key according to information including the basic key corresponding to the basic key identifier in the key update request message, the first random number and the second random number in the key update response message, and determines the valid IP communication information of the node 1 according to the address update notification message.

After the node 1 decrypts and obtains the address update notification message, the node 1 obtains the re-determined IP communication information of the node 1 from the address update notification message, and determines whether the re-determined IP communication information is the current valid IP communication information of the node 1. If so, the IP communication information carried in the address update notification message, of the node 1 is determined as the valid IP communication information of the node 1.

S206. The node 1 uses the IP communication information obtained from the second message to perform message encapsulation to obtain a third message and send the third message to the node 2. The third message includes the address update response message encrypted by the node 1 by using the first key.

The address update response message includes the valid IP communication information for indicating the node 1.

For example, relevant fields of the address update response message are composed as follows.

| Address update response identifier | IP$_1$' | Port$_1$'(SID$_1$') |
| --- | --- | --- |

IP$_1$', Port$_1$' (SID$_1$') are valid IP communication information of the node 1. The "address update response identifier" field is used to indicate whether the message is a notification message or a response message.

S207. The node 2 receives the third message, decrypts the third message with the first key to obtain the address update response message, determines the valid IP communication information of the node 1 according to the address update response message, and updates the locally stored IP communication information of the node 1 to the valid IP communication information of the node 1.

According to the above method, the node 2 can confirm whether the IP communication information of the node 1 changes through the address update response message in the third message.

S208. The node 1 and the node 2 use the updated IP communication information and the generated second key to perform message encapsulation and secure transmission.

It should be noted that, in the actual application scenario, if the node 1 is attacked by the network or an illegal node pretends to be the node 1, the IP communication information obtained by the node 2 from the first message may be tampered IP communication information, in order to avoid this potential safety hazard, the embodiments of the present disclosure further provides an optional implementation mode.

In S204, the node 2 re-determines the IP communication information of the node 1 and generates the address update notification message, including the followings.

The node 2 determines that the IP communication information of the node 1 stored locally is a first IP communication information, and determines that the IP communication information of the node 1 in the first message is a second IP communication information. The node 2 generates a first address update notification message used to indicate the first IP communication information, and a second address update notification message used to indicate the second IP communication information.

Afterwards, the node 2 uses the first key to encrypt the first address update notification message, carries the first address update notification message in the second message and sends the first address update notification message in the second message to a node corresponding to the first IP communication information. The node 2 uses the first key to encrypt the second address update notification message, carries the second address update notification message in the second message and sends the second address update notification message in the second message to a node corresponding to the second IP communication information.

That is, in S204, the node 2 sends the second message to the node 1, specifically including that: the node 2 sends the second message carrying the encrypted first address update notification message and the encrypted key update response message to the node corresponding to the first IP communication information; and the node 2 sends the second message carrying the encrypted second address update notification message and the encrypted key update response message to the node corresponding to the second IP communication information.

In this way, the node 2 sends the second message to an address of the node 1 before the node 1 sleeps and an address changed after the node 1 wakes up respectively, if the IP communication information of the node 1 does change after the node 1 wakes up from sleep, then the second message sent by the node 2 to the node corresponding to the second IP communication information will be received by the node 1. After receiving the second message, the node 1 notifies the node 2 that the IP communication information of the node 1 has indeed changed through a third message.

If the IP communication information of the node 1 does not change after waking up from sleep, then the second message sent by the node 2 to the node corresponding to the first IP communication information will be received by the node 1, and after the node 1 receives the second message, the node 1 notifies the node 2 that the IP communication information of the node 1 has not changed through the third message.

In general, the node 2 can usually only receive one third message, that is, the third message sent by the node corresponding to the second IP communication information. However, if the node 2 receives two third messages, that is, the third message sent by the node corresponding to the first IP communication information and the third message sent by the node corresponding to the second IP communication information, then it can be judged that the node corresponding to the second IP communication information is an illegal node masquerading as the node 1.

The node 1 and node 2 respectively generate a random number to generate a key, so that one of the nodes cannot perform secure channel communication without negotiating with the other node, thereby ensuring security.

Optionally, in the above embodiments, in order to ensure that the node 1 can verify the correctness of the received key update response message, the key update response message may further include the first random number obtained by the node 2 from the key update request message; then node 1 may check whether the first random number in the key update response message is the same as the first random number generated by the node 1 after obtaining the key update response message; if not, it determines that the obtained key update response message is incorrect, and discard the obtained key update response message.

Optionally, in the embodiments of the present disclosure, the node 1 and the node 2 respectively have specific identity information, and any one of the node 1 and the node 2 can determine whether the other one of the node 1 and the node 2 is legitimate according to the identity information of the other one of the node 1 and the node 2.

Therefore, in the above embodiments, the key update request message may further include identity information $ID_1$ of the node 1, and the key update response message may further include identity information $ID_2$ of the node 2.

Then, after the node 2 decrypts the key update request message by using the first key, the method further includes: the node 2 using $ID_1$ in the key update request message to determine whether the node 1 is a legitimate node.

Similarly, after the node 1 decrypts the key update response message by using the first key, the method further includes: the node 1 using $ID_2$ in the key update response message to determine whether the node 2 is a legitimate node.

In this way, by carrying the identity information of the nodes in the key update request message and the key update response message, the node receiving the message can verify the legitimacy of the node sending the message, further ensuring the security of communication.

When the key update request message further includes the identity information $ID_1$ of the node 1, and the key update response message further includes the identity information $ID_2$ of the node 2, the embodiments of the present disclosure further provide an implementation manner of calculating the second key, for example:

the node 2 calculates and generates the second key based on information including the basic key corresponding to the basic key identifier in the key update request message, the first random number, the identity information $ID_1$, and the second random number generated by the node 2, the identity information $ID_2$ of the node 2 and a constant character string;

the node 1 calculates and generates the second key based on information including the basic key corresponding to the basic key identifier, the second random number, the identity information $ID_2$, and the first random number generated by the node 1, the identity information $ID_1$ of the node 1, and a constant character string.

The constant character string is an optional field, and the constant character string is pre-shared between the node 1 and the node 2.

In addition, in the actual scenario of secure channel communication between two nodes, if one of the nodes enters the sleep state, when the dormant node wakes up, it is likely that anti-replay counter values of the dormant node and the peer node will be out of synchronization. In this case, the anti-replay counter value of the dormant node is calculated from an initial value, and the anti-replay counter value of the peer node is calculated from the last value used before the dormant node goes to sleep, so the anti-replay service of the peer node will discard the received IP group, thus causing the normal communication of the secure channel to fail.

In order to solve the above problem, in the embodiments of the present disclosure, in addition to saving the changed IP communication information immediately when the IP communication information changes, the node 1 and the node 2 can also store the changed anti-replay counter value immediately when the anti-replay counter value changes, and the stored anti-replay counter value is used for message encapsulation and transmission, so as to ensure that the dormant node can communicate with the peer node normally after being awakened.

For example, in S102/S105/S108/S202/S204/S206/S208, when the node 1 and/or the node 2 performs message encapsulation, the method further includes: encapsulating the stored anti-replay counter value field into a sent message.

Correspondingly, in S104/S107/S108/S203/S205/S207/S208, when the node 1 and/or the node 2 receives the message, the method further includes:

using an anti-replay algorithm to verify whether the anti-replay counter value field in the received message is within a legal range; if it is not within the legal range, discarding the received message.

By verifying whether the anti-replay counter value field in the message is within the legal range, the security of communication can be further ensured.

Optionally, when the node 1 and/or the node 2 perform message encapsulation, the method may further include: encapsulating a verification field for checking the integrity of the message into the sent message. The verification field is generated by performing integrity verification on the information in the message through a verification key shared by the node 1 and the node 2.

Correspondingly, when the node 1 and/or the node 2 receive the message, the method further includes: using the verification key to verify the verification field in the received message to determine whether the received message is complete.

In the specific implementation process, the verification field can be obtained by performing integrity verification calculation on the encrypted field (e.g., the key update request message in the first message, the key update response message and the address update notification message in the second message, and the address update response message in the third message, which can all be referred to as the encrypted field in the message) in the message through using the verification key; or, the verification field can also be obtained by calculating all information except the verification field in the message (e.g., the first message, the second message, and the third message) through using the verification key, which is not limited here. The verification key and the integrity verification algorithm used may be pre-shared between the node 1 and the node 2.

By carrying a verification field for verifying the content of the message in the message, it is possible to prevent the received message from being damaged and causing an error in obtaining information.

Based on the same inventive concept, the embodiments of the present disclosure further provide a secure channel sleep wake-up apparatus, which is configured on the node 1, as shown in FIG. 3, including:

a sleep wake-up unit 301 configured to obtain stored IP communication information for communicating with a node 2 in response to the node 1 waking up from a sleep state, where the IP communication information includes at least one of an IP address, a communication port number or a session identifier;

a first processing unit 302 configured to use the IP communication information to perform message encapsulation to obtain a first message and send the first message to the node 2, where the first message includes a key update request message subject to protection processing by using a first key shared with the node 2, and the key update request message includes a basic key identifier and a first random number generated by the node 1;

a second processing unit 303 configured to receive a second message sent by the node 2, obtain the IP communication information from the second message, and use the first key to perform de-protection processing to obtain a key update response message, where the key update response message includes a second random number generated by the node 2;

the second processing unit 303 further configured to calculate and generate a second key based on information including a basic key corresponding to the basic key identifier and the second random number, and the first random number generated by the node 1; and a communication unit 304 configured to perform message encapsulation and protection transmission with the node 2 by using the IP communication information and the second key.

Optionally, the sleep wake-up unit 301 obtains the stored IP communication information for communicating with node 2, by:

in response to the IP communication information of the node 1 not changing when the node 1 waking up, obtaining by the sleep wake-up unit 301, the IP communication information stored before entering the sleep state;

in response to the IP communication information of the node 1 changing when the node 1 waking up, storing immediately and obtaining, by the sleep wake-up unit 301, the changed IP communication information.

Optionally, the second message received by the second processing unit 303 further includes an address update notification message subject to protection processing by the node 2 using the first key, and the address update notification message is used to indicate re-determined IP communication information of the node 1.

Optionally, after receiving the second message, the second processing unit 303 is further configured to use the first key to perform de-protection processing to obtain the address notification message, and determine a valid IP communication information of the node 1 according to the address update notification message.

The apparatus further includes:

a third processing unit 305 configured to use the IP communication information obtained from the second message to perform message encapsulation to obtain a third message and send the third message to the node 2, where the third message includes an address update response message subject to protection processing by using the first key, and the address update response message is used to indicate the valid IP communication information of the node 1.

Optionally, the key update response message further includes a first random number obtained by the node 2 from the key update request message.

After obtaining the key update response message, the second processing unit 303 is further configured to check whether the first random number in the key update response message is the same as the first random number generated by the node 1; if not, discard the key update response message.

Optionally, the key update request message further includes identity information of the node 1, and the key update response message further includes identity information of the node 2.

The second processing unit 303 is further configured to use the identity information of the node 2 in the key update response message to determine whether the node 2 is a legitimate node.

Optionally, the second processing unit 303 calculates and generates the second keys based on information including a basic key corresponding to the basic key identifier and the second random number, and the first random number generated by the node 1, by:

the second processing unit 303 calculating and generating the second key based on information including a basic key corresponding to the basic key identifier, the second random number and the identity information of the node 2, and the first random number generated by the node 1, the identity information of the node 1 and a constant character string.

The constant character string is an optional field pre-shared between the node 1 and the node 2.

Optionally, the sleep wake-up unit 301 is further configured to, in response to an anti-replay counter value changing, immediately store changed anti-replay counter value; in response to the node 1 waking up from the sleep state, the sleep wake-up unit 301 is further configured to obtain the stored anti-replay counter value.

The first processing unit 302, the third processing unit 305 and/or the communication unit 304 are further configured to encapsulate an anti-replay counter value field into the sent message.

The second processing unit 303 and/or the communication unit 304 are further configured to use an anti-replay algorithm to verify whether the anti-replay counter value field in the a received message is within a legal range.

Optionally, the first processing unit 302, the third processing unit 305 and/or the communication unit 304 are further configured to encapsulate a verification field for verifying integrity of a message into a sent message, where the verification field is generated by performing integrity verification on information in the message through a verification key shared by the node 1 and the node 2.

The second processing unit 303 and/or the communication unit 304 are further configured to use the verification key to verify the verification field in received message to determine whether the message is complete.

Figure 4:
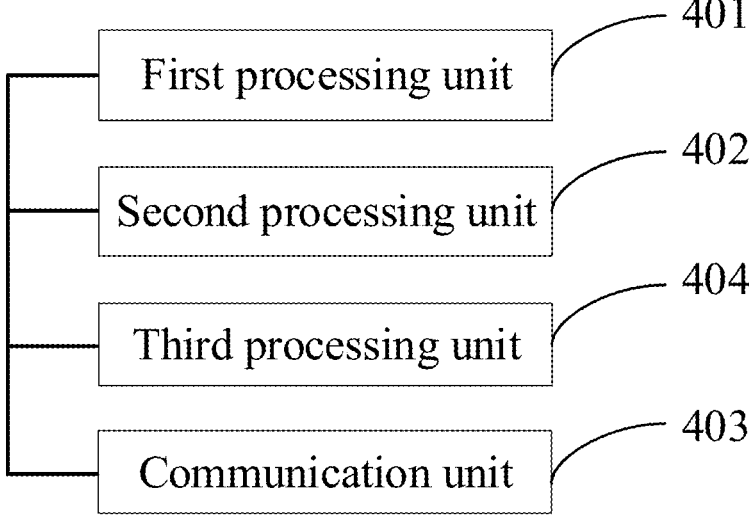
FIG. 4 is a schematic structural diagram of another secure channel sleep wake-up apparatus provided by an embodiment of the present disclosure.

Based on the same inventive concept, the embodiments of the present disclosure further provide a secure channel sleep wake-up apparatus, which is configured on the node 2, as shown in FIG. 4, including:

a first processing unit 401 configured to receive the first message sent by the node 1, obtain the IP communication information from the first message, and use the first key shared with the node 1 to perform de-protection processing to obtain the a key update request message, where the key update request message includes the basic key identifier and the first random number generated by the node 1;

where the first message includes the key update request message subject to protection processing by the node 1 using the first key shared with the node 2; the IP communication information includes at least one of an IP address, a communication port number or a session identifier;

the first processing unit 401 further configured to calculate and generate a second key according to information including the basic key corresponding to the basic key identifier and the first random number, and the second random number generated by the node 2;

a second processing unit 402 configured to use the IP communication information to perform message encapsulation to obtain a second message and send the second message to the node 1, where the second message includes a key update response message subject to protection processing by using the first key, and the key update response message includes the second random number; and a communication unit 403 configured to perform message encapsulation and protection transmission with the node 1 by using the IP communication information and the second key.

Optionally, the first processing unit 401 is further configured to re-determine the IP communication information of the node 1 and generate an address update notification message when the locally stored IP communication information of the node 1 is not the same as the IP communication information of the node 1 in the first message, and the address update notification message is used to indicate re-determined IP communication information of the node 1.

The second processing unit 402 is further configured to use the first key to perform protection processing on the address update notification message and send the address update notification message by carrying the address update notification message in the second message to the node 1.

Optionally, the apparatus further includes:

a third processing unit 404 configured to receive the third message sent by the node 1, use the first key to perform de-protection processing on the third message to obtain an address update response message, determine the valid IP communication information of the node 1 based on the address update response message, and update the locally stored IP communication information of the node 1 to the valid IP communication information of the node 1.

Optionally, the first processing unit 401 re-determines the IP communication information of the node 1 and generates an address update notification message, including:

determining that the IP communication information of the node 1 stored locally is the first IP communication information, and determining that the IP communication information of the node 1 in the first message is the second IP communication information;

generating a first address update notification message for indicating the first IP communication information, and generating a second address update notification message for indicating the second IP communication information.

The second processing unit 402 uses the first key to perform protection processing on the address update notification message and sends the address update notification message by carrying the address update notification message in the second message to the node 1, including:

using the first key to protect the first address update notification message, carrying the protected first address update notification message in the second message and sending the protected first address update notification message to the node corresponding to the first IP communication information; and using the first key to protect the second address update notification message, carrying the protected second address update notification message in the second message, and sending the protected second address update notification message to the node corresponding to the second IP communication information.

Optionally, the key update response message further includes the first random number obtained by the first processing unit 401 from the key update request message.

Optionally, the key update request message further includes the identity information of the node 1, and the key update response message further includes the identity information of the node 2.

The first processing unit 401 is further configured to use the identity information of the node 1 in the key update request message to determine whether the node 1 is a legitimate node.

Optionally, the first processing unit 401 calculates and generates the second key according to information including the basic key corresponding to the basic key identifier and the first random number, and the second random number generated by the node 2, include that:

the first processing unit 401 calculates and generates the second key based on the information including the basic key corresponding to the basic key identifier, the first random number, and the identity information of the node 1, and the second random number generated by the node 2, the identity information of the node 2 and the constant character string.

The constant character string is an optional field pre-shared between the node 1 and the node 2.

Optionally, the first processing unit 401 is further configured to immediately store the changed anti-replay counter value when the anti-replay counter value changes.

The second processing unit 402 and/or the communication unit 403 are further configured to encapsulate the anti-replay counter value field into the sent message.

The first processing unit 401, the third processing unit 404 and/or the communication unit 403 are further configured to use an anti-replay algorithm to verify whether the anti-replay counter value field in the received message is within a legal range.

Optionally, the second processing unit 402 and/or the communication unit 403 is/are further configured to encapsulate the verification field for verifying the integrity of the message into the sent message, the verification field is generated by performing integrity verification on the information in the message through the verification key shared by the node 1 and the node 2.

The first processing unit 401, the third processing unit 404 and/or the communication unit 403 is/are further configured to use the verification key to verify the verification field in the received message to determine whether the message is complete.

Figure 5:
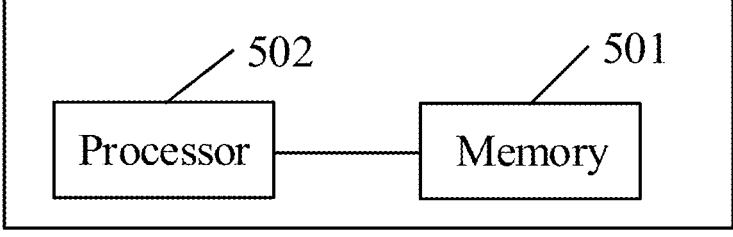
FIG. 5 is a schematic structural diagram of a secure channel sleep wake-up device provided by an embodiment of the present disclosure.

Since the specific content performed by the secure channel sleep wake-up apparatus corresponds to the secure channel sleep wake-up method in the embodiments of the present disclosure, and the problem-solving principle of the apparatus is similar to the secure channel sleep wake-up method, so the implementation of the apparatus can refer to the implementation of the method, and the repetition will be omitted. Based on the same inventive concept, the embodiments of the present disclosure further provide a secure channel sleep wake-up device, as shown in FIG. 5, and the secure channel sleep wake-up device includes:

a memory 501 configured to store program instructions; and a processor 502 configured to invoke the program instructions stored in the memory 501, and execute the following processes according to the obtained program instructions:

when the node 1 wakes up from the sleep state, obtaining the stored IP communication information for communicating with the node 2, where the IP communication information includes at least one of an IP address, a communication port number, or a session identifier;

using the IP communication information to perform message encapsulation to obtain a first message and sending the first message to the node 2, where the first message includes a key update request message subject to protection processing by using the first key shared with the node 2, and the key update request message includes a basic key identifier and the first random number generated by the node 1;

receiving the second message sent by the node 2, obtaining the IP communication information from the second message and performing de-protection processing by using the first key to obtain a key update response message, where the key update response message includes the second random number generated by the node 2;

calculating and generating a second key according to information including the basic key corresponding to the basic key identifier and the second random number, and the first random number generated by the node 1; and performing message encapsulation and protection transmission with the node 2 by using the IP communication information and the second key.

Optionally, the obtaining the stored IP communication information for communicating with the node 2 includes:

if the IP communication information of the node 1 does not change when the node 1 wakes up, then obtaining the IP communication information stored before entering the sleep state;

if the IP communication information of the node 1 changes when the node 1 wakes up, storing and obtaining the changed IP communication information immediately.

Optionally, the received second message further includes an address update notification message subject to protection processing by the node 2 using the first key, and the address update notification message is used to indicate the re-determined IP communication information of the node 1.

Optionally, after receiving the second message, the processor 502 is further configured to use the first key to perform de-protection processing to obtain the address update notification message, and determine the valid IP communication information of the node 1 according to the address update notification message.

The processor 502 is further configured to:

use the IP communication information obtained from the second message to perform message encapsulation to obtain a third message and send the third message to the node 2, where the third message includes an address update response message subject to protection processing by using the first key, and the address update response message is used to indicate the valid IP communication information of the node 1.

Optionally, the key update response message further includes the first random number obtained by the node 2 from the key update request message.

After obtaining the key update response message, the processor 502 checks whether the first random number in the key update response message is the same as the first random number generated by the node 1; if not, then discard the key update response message.

Optionally, the key update request message further includes the identity information of the node 1, and the key update response message further includes the identity information of the node 2.

The processor 502 is further configured to use the identity information of the node 2 in the key update response message to determine whether the node 2 is a legitimate node.

Optionally, calculating and generating the second key according to information including the basic key corresponding to the basic key identifier and the second random number, and the first random number generated by the node 1, includes that:

the processor 502 calculates and generates the second key based on information including the basic key corresponding to the basic key identifier, the second random number and the identity information of the node 2, and the first random number generated by the node 1, the identity information of the node 1 and a constant character string.

The constant character string is an optional field pre-shared between the node 1 and the node 2.

Optionally, the processor 502 is further configured to immediately store the changed anti-replay counter value when the anti-replay counter value changes; when the node 1 wakes up from the sleep state, the processor 502 is further configured to obtain the stored anti-replay counter value.

The processor 502 is further configured to encapsulate the anti-replay counter value field into the sent message.

The processor 502 is further configured to use an anti-replay algorithm to verify whether the anti-replay counter value field in the received message is within a legal range.

Optionally, the processor 502 is further configured to encapsulate a verification field for verifying the integrity of the message into the sent message. The verification field is generated by performing integrity verification on the information in the message through the verification key shared between the node 1 and the node 2.

The processor 502 is further configured to use the verification key to verify the verification field in the received message to determine whether the message is complete.

Figure 6:
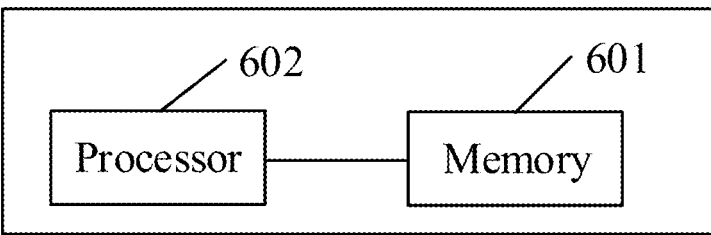
FIG. 6 is a schematic structural diagram of another secure channel sleep wake-up device provided by an embodiment of the present disclosure.

Based on the same inventive concept, the embodiments of the present disclosure further provide a secure channel sleep wake-up device, as shown in FIG. 6, and the secure channel sleep wake-up device includes:

a memory 601 configured to store program instructions; and a processor 602 configured to invoke the program instructions stored in the memory 601, and execute the following processes according to the obtained program instructions:

receiving the first message sent by the node 1, obtaining IP communication information from the first message and performing de-protection processing using the first key shared with node 1 to obtain a key update request message, where the key update request message includes the basic key identifier and the first random number generated by the node 1;

where the first message includes a key update request message subject to protection processing by the node 1 using the first key shared with the node 2; and the IP communication information includes at least one of an IP address, a communication port number or a session identifier.

calculating and generating a second key based on information including the basic key corresponding to the basic key identifier and the first random number, and the second random number generated by the node 2;

using the IP communication information to perform message encapsulation to obtain a second message and send the second message to the node 1, where the second message includes a key update response message subject to protection processing by using the first key, and the key update response message includes the second random number; and performing message encapsulation and protection transmission with the node 1 by using the IP communication information and the second key.

Optionally, the processor 602 is further configured to re-determine the IP communication information of the node 1 and generate an address update notification message when it is detected that the IP communication information of the node 1 stored locally is different from the IP communication information of the node 1 in the first message, and the address update notification message is used to indicate the re-determined IP communication information of the node 1.

The processor 602 is further configured to use the first key to protect the address update notification message, carry the address update notification message in the second message, and send the address update notification message in the second message to the node 1.

Optionally, the processor 602 is further configured to:

receive the third message sent by the node 1, use the first key to perform de-protection processing on the third message to obtain an address update response message, determine the valid IP communication information of the node 1 according to the address update response message, and update the locally stored IP communication information of the node 1 to the valid IP communication information of the node 1.

Optionally, the re-determining the IP communication information of the node 1 and generating an address update notification message includes:

determining that the IP communication information of the node 1 stored locally is the first IP communication information, and determining that the IP communication information of the node 1 in the first message is the second IP communication information;

generating a first address update notification message for indicating the first IP communication information, and generating a second address update notification message for indicating the second IP communication information.

The process of using the first key to protect the address update notification message, carrying the address update notification message in the second message and sending the address update notification message in the second message to the node 1, includes:

using the first key to protect the first address update notification message, carrying the protected first address update notification message in the second message and sending the protected first address update notification message to the node corresponding to the first IP communication information;

using the first key to protect the second address update notification message, carrying the protected second address update notification message in the second message and sending the protected second address update notification message to the node corresponding to the second IP communication information.

Optionally, the key update response message further includes the first random number obtained from the key update request message.

Optionally, the key update request message further includes the identity information of the node 1, and the key update response message further includes the identity information of the node 2.

The processor 602 is further configured to use the identity information of the node 1 in the key update request message to determine whether the node 1 is a legitimate node.

Optionally, the calculating and generating the second key based on information including the basic key corresponding to the basic key identifier and the first random number, and the second random number generated by the node 2, includes that:

the processor 602 calculates and generates the second key based on information including the basic key corresponding to the basic key identifier, the first random number and the identity information of the node 1, and the second random number generated by the node 2, the identity information of the node 2, and a constant character string.

The constant character string is an optional field pre-shared between the node 1 and the node 2.

Optionally, the processor 602 is further configured to immediately store the changed anti-replay counter value when the anti-replay counter value changes.

The processor 602 is further configured to encapsulate the anti-replay counter value field into the sent message.

The processor 602 is further configured to use an anti-replay algorithm to verify whether the anti-replay counter value field in the received message is within a legal range.

Optionally, the processor 602 is further configured to encapsulate a verification field for verifying the integrity of the message in the sent message, where the verification field is generated by performing integrity verification on the information in the message through the verification key shared between node 1 and the node 2.

The processor 602 is further configured to use the verification key to verify the verification field in the received message to determine whether the message is complete.

Based on the same inventive concept, an embodiment of the present disclosure further provides a computer-readable storage medium, on which computer programs are stored, and when the computer programs are executed by a processor, the steps of the secure channel sleep wake-up method provided in the above-mentioned embodiments is implemented.

In the several embodiments provided in the present disclosure, it should be understood that the disclosed system, device and method can be implemented in other ways. For example, the device embodiments described above are only illustrative. For example, the division of the units is only a logical function division. In actual implementation, there may be other division methods. For example, multiple modules or components can be combined or may be integrated into another system, or some features may be ignored, or not implemented. In another point, the mutual coupling or direct coupling or communication connection shown or discussed may be through some interfaces, and the indirect coupling or communication connection of devices or modules may be in electrical, mechanical or other forms.

The modules described as separate components may or may not be physically separated, and the components displayed as modules may or may not be physical modules, that is, they may be located in one place, or may be distributed to multiple network modules. Part or all of the modules can be selected according to actual needs to achieve the purpose of the solution of the embodiments.

In addition, each functional module in each embodiment of the present disclosure may be integrated into one processing module, each module may exist separately physically, or two or more modules may be integrated into one module. The above-mentioned integrated modules can be implemented in the form of hardware or in the form of software function modules. If the integrated modules are realized in the form of software function modules and sold or used as independent products, they can be stored in a computer-readable storage medium.

In the above embodiments, all or part of them may be implemented by software, hardware, firmware or any combination thereof. When implemented using software, it may be implemented in whole or in part in the form of a computer program product.

The computer program product includes one or more computer instructions. When the computer program instructions are loaded and executed on the computer, the processes or functions according to the embodiments of the present disclosure will be generated in whole or in part. The computer can be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from one website, computer, server or data center to another website, computer, server or data center via wired (such as coaxial cable, optical fiber, digital subscriber line, DSL) or wireless (such as infrared, wireless, microwave, etc.) means. The computer-readable storage medium may be any available medium that can be stored by a computer, or a data storage device such as a server or a data center integrated with one or more available media. The available medium may be a magnetic medium (such as a floppy disk, a hard disk, or a magnetic tape), an optical medium (such as a DVD), or a semiconductor medium (such as a solid state disk (SSD) and the like.

The technical solution provided by the present disclosure has been introduced in detail above. In the present disclosure, specific examples have been used to illustrate the principles and implementation methods of the application. The descriptions of the above examples are only used to help understand the method and core ideas of the application; meanwhile, for those of ordinary skill in the art, according to the ideas of the application, there will be changes in the specific implementation methods and application scope. In summary, the content of this specification should not be interpreted as limiting the application.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may take the form of a computer program product embodied on one or more computer-readable storage media (including but not limited to disk storage, CD-ROM, optical storage, etc.) having computer-usable program code embodied therein.

The present disclosure is described with reference to flowchart illustrations and/or block diagrams of methods, apparatus (systems), and computer program products according to the present disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, special purpose computer, embedded processor, or processor of other programmable data processing equipment to produce a machine such that the instructions executed by the processor of the computer or other programmable data processing equipment produce a An apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture including instruction means, the instructions The device realizes the function specified in one or more procedures of the flowchart and/or one or more blocks of the block diagram.

These computer program instructions can also be loaded onto a computer or other programmable data processing device, causing a series of operational steps to be performed on the computer or other programmable device to produce a computer-implemented process, thereby The instructions provide steps for implementing the functions specified in the flow chart or blocks of the flowchart and/or the block or blocks of the block diagrams.

Obviously, those skilled in the art can make various changes and modifications to the application without departing from the spirit and scope of the application. In this way, if these modifications and variations of the present disclosure fall within the scope of the claims of the present disclosure and their equivalent technologies, the present disclosure is also intended to include these modifications and variations.

What is claimed is:

1. A secure channel sleep wake-up method, comprising:

in response to a node 1 waking up from a sleep state, obtaining, by the node 1, stored IP communication information for communicating with a node 2, wherein the IP communication information comprises at least one of an IP address, a communication port number, or a session identifier;

using, by the node 1, the IP communication information to perform message encapsulation to obtain a first message and sending the first message to the node 2, wherein the first message comprises a key update request message subject to protection processing by using a first key shared with the node 2, and the key update request message comprises a basic key identifier and a first random number generated by the node 1;

receiving, by the node 2, the first message, obtaining the IP communication information from the first message, using the first key to perform de-protection processing to obtain the key update request message, and calculating and generating a second key based on information comprising a basic key corresponding the basic key identifier and the first random number in the key update request message, and a second random number generated by the node 2;

using, by the node 2, the IP communication information to perform message encapsulation to obtain a second message and sending the second message to the node 1, wherein the second message comprises a key update response message subject to protection processing by using the first key, and the key update response message comprises the second random number;

receiving, by the node 1, the second message, obtaining the IP communication information from the second message, and using the first key to perform de-protection processing to obtain the key update response message, calculating and generating the second key based on information comprising the basic key corresponding to the basic key identifier and the second random number, and the first random number generated by the node 1; and using, by the node 1 and the node 2, the IP communication information and the second key to perform message encapsulation and protection transmission.

2. The method according to claim 1, wherein in response to the node 1 waking up from the sleep state, the obtaining the stored IP communication information for communicating with the node 2, comprises:

in response to the IP communication information of the node 1 not changing when the node 1 waking up, obtaining, by the node 1, the IP communication information stored before entering the sleep state;

in response to the IP communication information of the node 1 changing when the node 1 waking up, storing immediately and obtaining, by the node 1, the changed IP communication information.

3. The method according to claim 1, wherein after receiving, by the node 2, the first message, the method further comprises:

in response to the node 2 detecting that locally stored IP communication information of the node 1 is different from the IP communication information of the node 1 in the first message, re-determining, by the node 2, the IP communication information of the node 1 and generating an address update notification message, wherein the address update notification message is used to indicate the re-determined IP communication information of the node 1;

the using, by the node 2, the IP communication information to perform message encapsulation to obtain the second message and sending the second message to the node 1, further comprises:

performing, by the node 2, protection processing on the address update notification message by using the first key, carrying the address update notification message after the protection processing in the second message, and sending the address update notification message in the second message to the node 1.

4. The method according to claim 3, wherein after receiving, by the node 1, the second message, the method further comprises:

using, by the node 1, the first key to perform de-protection processing to obtain the address update notification message, and determining a valid IP communication information of the node 1 according to the address update notification message;

using, by the node 1, the IP communication information obtained from the second message to perform message encapsulation to obtain a third message and sending the third message to the node 2, wherein the third message comprises an address update response message subject to protection processing by using the first key, and the address update response message is used to indicate the valid IP communication information of the node 1;

receiving, by the node 2, the third message, using the first key to perform de-protection processing to obtain the address update response message, and determining the valid IP communication information of the node 1 according to the address update response message; and updating, by the node 2, the locally stored IP communication information of the node 1 to the valid IP communication information of the node 1.

5. The method according to claim 3, wherein the re-determining, by the node 2, the IP communication information of the node 1, comprises:

determining, by the node 2, that the locally stored IP communication information of the node 1 is a first IP communication information, and determining that the IP communication information of the node 1 in the first message is a second IP communication information;

the generating, by the node 2, the address update notification message, performing protection processing on the address update notification message by using the first key, carrying the address update notification message after the protection processing in the second message, and sending the address update notification message in the second message to the node 1, comprises:

generating, by the node 2, a first address update notification message for indicating the first IP communication information, and generating a second address update notification message for indicating the second IP communication information;

performing, by the node 2, protection processing on the first address update notification message by using the first key, carrying the first address update notification message after the protection processing in the second message, and sending the first address update notification message in the second message to a node corresponding to the first IP communication information; and performing, by the node 2, protection processing on the second address update notification message by using the first key, carrying the second address update notification message after the protection processing in the second message, and sending the second address update notification message in the second message to a node corresponding to the second IP communication information.

6. The method according to claim 1, wherein the key update response message further comprises a first random number obtained by the node 2 from the key update request message;

after obtaining the key update response message by the node 1, checking, by the node 1, whether the first random number in the key update response message is the same as the first random number generated by the node 1; if not, discarding the key update response message.

7. The method according to claim 1, wherein the key update request message further comprises identity information of the node 1, and the key update response message further comprises identity information of the node 2;

after using, by the node 2, the first key to perform de-protection processing to obtain the key update request message, the method further comprises:

using, by the node 2, the identity information of the node 1 in the key update request message to determine whether the node 1 is a legitimate node;

after using, by the node 1, the first key to perform de-protection processing to obtain the key update response message, the method further comprises:

using, by the node 1, the identity information of the node 2 in the key update response message to determine whether the node 2 is a legitimate node.

8. The method according to claim 7, wherein the calculating and generating the second key by the node 2 based on the information comprising the basic key corresponding to the basic key identifier and the first random number in the key update request message, and the second random number generated by the node 2, comprises:

calculating and generating, by the node 2, the second key based on information comprising the basic key corresponding to the basic key identifier, the first random number, and the identity information of the node 1 in the key update request message, and the second random number generated by the node 2, the identity information of the node 2 and a constant character string;

the calculating and generating, by the node 1, the second key based on the information comprising the basic key corresponding to the basic key identifier and the second random number, and the first random number generated by the node 1, comprises:

calculating and generating, by the node 1, the second key based on information comprising the basic key corresponding to the basic key identifier, the second random number and the identity information of the node 2, and the first random number generated by the node 1, the identity information of the node 1 and the constant character string;

wherein the constant character string is an optional field pre-shared between the node 1 and the node 2.

9. A secure channel sleep wake-up apparatus, configured on a node 1, comprising at least one processor and a memory, wherein the at least one processor is configured to execute instructions stored in the memory to:

obtain stored IP communication information for communicating with a node 2 in response to the node 1 waking up from a sleep state, wherein the IP communication information comprises at least one of an IP address, a communication port number, or a session identifier;

use the IP communication information to perform message encapsulation to obtain a first message and send the first message to the node 2, wherein the first message comprises a key update request message subject to protection processing by using a first key shared with the node 2, and the key update request message comprises a basic key identifier and a first random number generated by the node 1;

receive a second message sent by the node 2, obtain the IP communication information from the second message, and use the first key to perform de-protection processing to obtain a key update response message, wherein the key update response message comprises a second random number generated by the node 2;

calculate and generate a second key based on information comprising a basic key corresponding to the basic key identifier and the second random number, and the first random number generated by the node 1; and perform message encapsulation and protection transmission with the node 2 by using the IP communication information and the second key.

10. The apparatus according to claim 9, wherein the at least one processor is further configured to execute instructions stored in the memory to:

in response to the IP communication information of the node 1 not changing when the node 1 waking up, obtain the IP communication information stored before entering the sleep state;

in response to the IP communication information of the node 1 changing when the node 1 waking up, store immediately and obtain the changed IP communication information.

11. The apparatus according to claim 9, wherein the second message further comprises an address update notification message subject to protection processing by the node 2 using the first key, and the address update notification message is used to indicate re-determined IP communication information of the node 1;

wherein, after receiving the second message, the at least one processor is further configured to execute instructions stored in the memory to use the first key to perform de-protection processing to obtain the address update notification message, and determine a valid IP communication information of the node 1 according to the address update notification message;

wherein the at least one processor is further configured to execute instructions stored in the memory to:

use the IP communication information obtained from the second message to perform message encapsulation to obtain a third message and send the third message to the node 2, wherein the third message comprises an address update response message subject to protection processing by using the first key, and the address update response message is used to indicate the valid IP communication information of the node 1.

12. The apparatus according to claim 9, wherein the key update response message further comprises a first random number obtained by the node 2 from the key update request message;

after obtaining the key update response message, the at least one processor is further configured to execute instructions stored in the memory to check whether the first random number in the key update response message is the same as the first random number generated by the node 1; if not, discard the key update response message.

13. The apparatus according to claim 9, wherein the key update request message further comprises identity information of the node 1, and the key update response message further comprises identity information of the node 2;

wherein the at least one processor is further configured to execute instructions stored in the memory to use the identity information of the node 2 in the key update response message to determine whether the node 2 is a legitimate node.

14. The apparatus according to claim 13, wherein the at least one processor is further configured to execute instructions stored in the memory to:

calculate and generate the second key based on information comprising a basic key corresponding to the basic key identifier, the second random number and the identity information of the node 2, and the first random number generated by the node 1, the identity information of the node 1 and a constant character string;

wherein the constant character string is an optional field pre-shared between the node 1 and the node 2.

15. A secure channel sleep wake-up apparatus, configured on a node 2, comprising at least one processor and a memory, wherein the at least one processor is configured to execute instructions stored in the memory to:

receive a first message sent by a node 1, obtain a IP communication information from the first message, and use a first key shared with the node 1 to perform de-protection processing to obtain a key update request message, wherein the key update request message comprises a basic key identifier and a first random number generated by the node 1;

wherein the first message comprises the key update request message subject to protection processing by the node 1 using the first key shared with the node 2; the IP communication information comprises at least one of an IP address, a communication port number or a session identifier;

calculate and generate a second key based on information comprising a basic key corresponding to the basic key identifier and the first random number, and a second random number generated by the node 2;

use the IP communication information to perform message encapsulation to obtain a second message and send the second message to the node 1, wherein the second message comprises a key update response message subject to protection processing by using the first key, and the key update response message comprises the second random number; and perform message encapsulation and protection transmission with the node 1 by using the IP communication information and the second key.

16. The apparatus according to claim 15, wherein the at least one processor is further configured to execute instructions stored in the memory to, in response to detecting that locally stored IP communication information of the node 1 is different from the IP communication information of the node 1 in the first message, re-determine the IP communication information of the node 1 and generate an address update notification message, and the address update notification message is used to indicate the re-determined IP communication information of the node 1;

wherein the at least one processor is further configured to execute instructions stored in the memory to use the first key to perform protection processing on the address update notification message, carry the address update notification message after the protection processing in the second message, and send the address update notification message in the second message to the node 1;

wherein the at least one processor is further configured to execute instructions stored in the memory to:

receive a third message sent by the node 1, use the first key to perform de-protection processing on the third message to obtain an address update response message, determine a valid IP communication information of the node 1 based on the address update response message, and update the locally stored IP communication information of the node 1 to the valid IP communication information of the node 1.

17. The apparatus according to claim 16, wherein the at least one processor is further configured to execute instructions stored in the memory to: determine that the locally stored IP communication information of the node 1 is a first IP communication information, and determine that the IP communication information of the node 1 in the first message is a second IP communication information;

generate a first address update notification message for indicating the first IP communication information, and generate a second address update notification message for indicating the second IP communication information;

wherein the at least one processor is further configured to execute instructions stored in the memory to:

use the first key to perform protection processing on the first address update notification message, carry the first address update notification message after the protection processing in the second message, and send the first address update notification message in the second message to a node corresponding to the first IP communication information; and use the first key to perform protection processing on the second address update notification message, carry the second address update notification message after the protection processing in the second message, and send the second address update notification message in the second message to a node corresponding to the second IP communication information.

18. The apparatus according to claim 15, wherein the key update response message further comprises a first random number from the key update request message.

19. The apparatus according to claim 15, wherein the key update request message further comprises identity information of the node 1, and the key update response message further comprises identity information of the node 2;

wherein the at least one processor is further configured to execute instructions stored in the memory to use the identity information of the node 1 in the key update request message to determine whether the node 1 is a legitimate node.

20. The apparatus according to claim 19, wherein the at least one processor is further configured to execute instructions stored in the memory to:

calculate and generate the second key based on information comprising the basic key corresponding to the basic key identifier, the first random number and the identity information of the node 1, and the second random number generated by the node 2, the identity information of the node 2 and a constant character string;

wherein the constant character string is an optional field pre-shared between the node 1 and the node 2.

* * * * *